US011185056B2

(12) United States Patent
Rudolph et al.

(10) Patent No.: US 11,185,056 B2
(45) Date of Patent: Nov. 30, 2021

(54) RACK FOR HOLDING FATTENING POULTRY CAGES, AND FATTENING POULTRY CAGE

(71) Applicant: Fit Farm Innovation Team GmbH, Steinfurt (DE)

(72) Inventors: Jens Rudolph, Steinfurt (DE); Sergej Babitzki, Hannover (DE)

(73) Assignee: Fit Farm Innovation Team GmbH, Steinfurt (DE)

( * ) Notice: Subject to any disclaimer, the term of this patent is extended or adjusted under 35 U.S.C. 154(b) by 860 days.

(21) Appl. No.: 16/084,738

(22) PCT Filed: Oct. 6, 2016

(86) PCT No.: PCT/EP2016/073891
§ 371 (c)(1),
(2) Date: Sep. 13, 2018

(87) PCT Pub. No.: WO2017/060358
PCT Pub. Date: Apr. 13, 2017

(65) Prior Publication Data
US 2020/0296939 A1  Sep. 24, 2020

(30) Foreign Application Priority Data
Oct. 6, 2015 (DE) .......................... 102015116966.5

(51) Int. Cl.
*A01K 45/00* (2006.01)
*A01K 31/00* (2006.01)
(Continued)

(52) U.S. Cl.
CPC .......... *A01K 45/005* (2013.01); *A01K 31/005* (2013.01); *A01K 31/007* (2013.01); *A01K 31/06* (2013.01); *A01K 31/18* (2013.01)

(58) Field of Classification Search
CPC .. A01K 45/005; A01K 31/002; A01K 31/007; A01K 31/07; A01K 31/005; A01K 31/18; A01K 31/06
(Continued)

(56) References Cited

U.S. PATENT DOCUMENTS 3,272,182 A * 9/1966 Lund ................. A01K 45/005
119/843
3,782,398 A * 1/1974 Powell ................ A01K 45/005
134/133
(Continued)

FOREIGN PATENT DOCUMENTS

CA    836860 A1    3/1970
EP    2781270 A1   9/2014

OTHER PUBLICATIONS

Examination Report issued in the corresponding European Application No. 16 790 275.8-1011, dated Jun. 4, 2019 (2 pages).

*Primary Examiner* — Yvonne R Abbott-Lewis
(74) *Attorney, Agent, or Firm* — Adams and Reese LLP; Raymond R. Ferrera

(57) ABSTRACT

The invention relates to a rack (10) for receiving fattening poultry cages, (20) comprising: a frame structure (12), a plurality of levels (14) for receiving a plurality of fattening poultry cages (20), and a plurality of conveying means (16) associated with each of the levels (14). The means of conveyance (16) are arranged in such a way that they transport the cages (20) located in the rack (10) within the respective level (14) to and/or away from a unloading point (30). Further, the invention relates to a fattening poultry cage (20) for arrangement in such a rack (10). Finally, the invention relates to a system of racks (10) and cages (20) according to the invention. The system may comprise an industrial truck (22) with lifting means for removing cages (20) from or feeding cages into the rack (10), the lifting means comprising a plurality of fork carriages (24) arranged vertically one above the other and movable in a vertical direction relative to one another.

16 Claims, 6 Drawing Sheets

(51) Int. Cl.
*A01K 31/06* (2006.01)
*A01K 31/18* (2006.01)

(58) Field of Classification Search
USPC .................. 119/453, 489, 845, 437, 843
See application file for complete search history.

(56) References Cited

U.S. PATENT DOCUMENTS

| | | | | |
|---|---|---|---|---|
| 3,952,703 | A * | 4/1976 | Erfeling | A01K 31/005 |
| | | | | 119/453 |
| 4,020,793 | A | 5/1977 | Morrison | |
| 4,036,177 | A | 7/1977 | DeSmit | |
| 4,480,588 | A | 11/1984 | Holladay et al. | |
| 5,470,194 | A | 11/1995 | Zegers | |
| 5,570,657 | A * | 11/1996 | Kuhlmann | A01K 31/007 |
| | | | | 119/458 |
| 5,660,147 | A * | 8/1997 | Wills | A01K 45/005 |
| | | | | 119/846 |
| 6,612,918 | B2 * | 9/2003 | Livingston | A01K 45/005 |
| | | | | 119/846 |
| 2002/0015635 | A1 * | 2/2002 | Sinn | B65G 41/008 |
| | | | | 414/346 |
| 2002/0029750 | A1 * | 3/2002 | Taylor | A01K 45/005 |
| | | | | 119/843 |
| 2004/0102147 | A1 | 5/2004 | Draft | |
| 2019/0223414 | A1 * | 7/2019 | Ovesen | A01K 31/002 |

\* cited by examiner

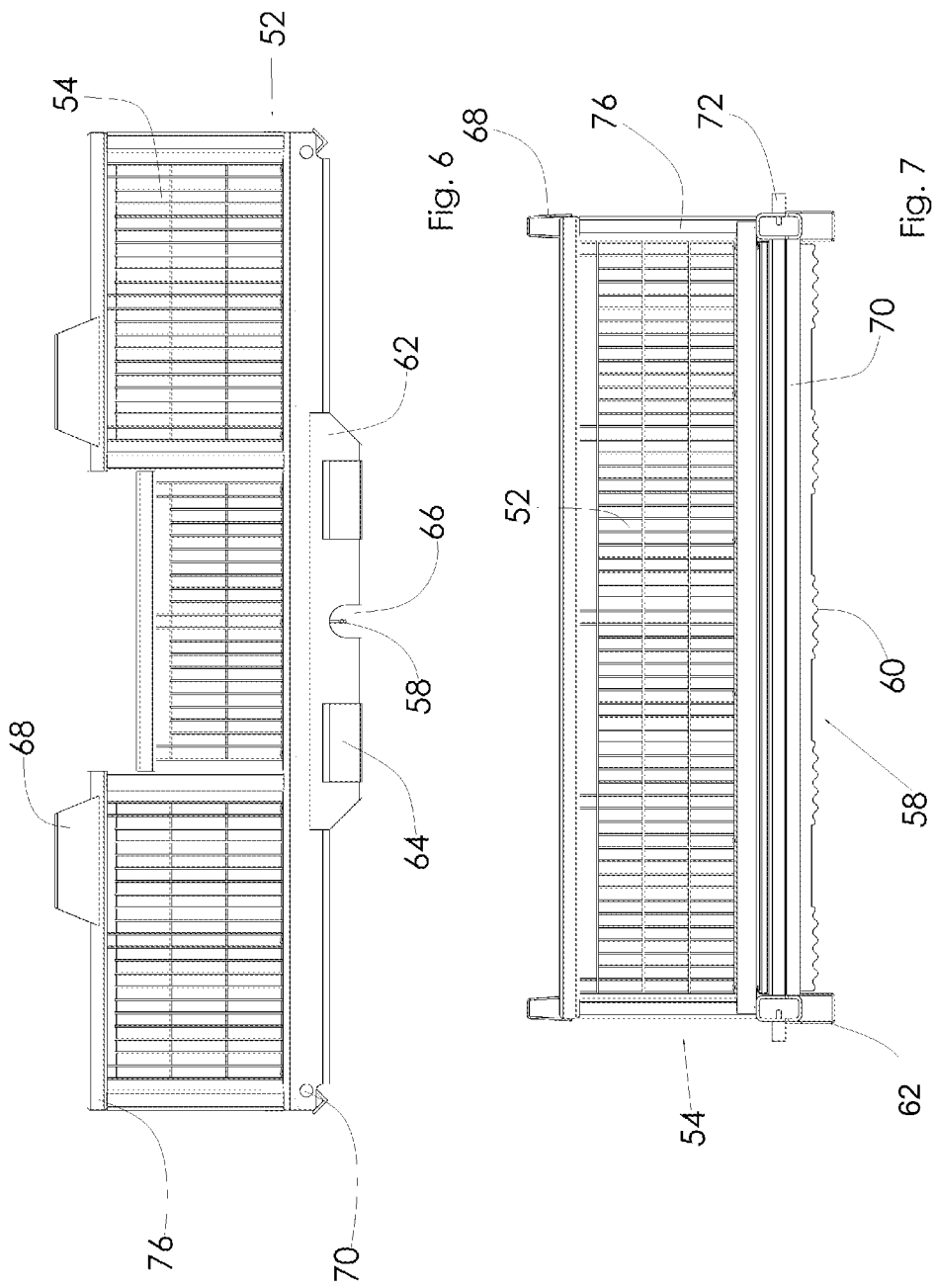

RACK FOR HOLDING FATTENING POULTRY CAGES, AND FATTENING POULTRY CAGE

The invention concerns a rack and a fattening poultry cage for rearing fattening poultry, and a system of an inventive rack and a fattening poultry cage.

It has been known for a long time and is also common practice to keep fattened poultry in cages during breeding, the so-called nesting. Shortly after hatching, the chicks are placed in the cages and remain there until they are transported to the slaughterhouse. To ensure that as many fattening animals as possible can be bred on as small an area as possible, multi-day racks are known in which a large number of cages can be stored on several levels arranged one above the other. Maintaining the health of animals and humans is playing an increasingly important role in the rearing of fattening poultry. The faeces of the animals are a particular source of danger. In addition to the associated high ammonia emission in the air in the barn, which pollutes the respiratory tract of animals and humans, feces lying around also promote the development of diseases. DE 20 2007 003 455 U1, for example, shows a poultry cage arrangement with several cages arranged in a row and rows of cages arranged vertically one above the other, which comprises a longitudinal conveyor belt running below a manure-permeable bottom surface of the cages and transporting the manure away.

If the animals have their final weight after about 40 days, they are taken out of the cages and then transported to the slaughterhouse in another container. This transhipment leads to a stress situation in the animals, which can have a negative effect on meat quality. Furthermore, the animals can injure themselves during transhipment. In the worst case, transhipment can lead to the death of individual fattening animals. The DOA (Death-on-Arrival) quota at the slaughterhouse is therefore unpleasantly high. Also with the known rearing systems the amount of work is very high. The loading of the fattening animals is personnel-intensive. The cost pressure resulting from personnel costs is leading to cost-cutting measures elsewhere. This is often accompanied by a deterioration in the welfare of fattening animals and a corresponding deterioration in meat quality.

It is therefore the objective of the invention to provide an improved rack and an improved fattening poultry cage for the rearing of fattening poultry of the species mentioned above. On the one hand, the invention is intended to reduce the strain and stress to which fattening animals are exposed during rearing until slaughter, so that the DOA quota decreases and the meat quality improves. On the other hand, personnel costs should be reduced to a minimum.

This objective is solved by a rack with the characteristics of claim 1, a fattening poultry cage with the characteristics of claim 7 and a system with the characteristics of claim 14 as well as a method with the characteristics of claim 19. It should be noted that the features listed in the claims can be combined with each other in any technologically meaningful way and thus show further forms of the invention.

An inventive rack for receiving fattening poultry cages comprises a frame construction, a plurality of levels for receiving a plurality of fattening poultry cages arranged one behind the other along the longitudinal extent of the rack, and at least one conveying means which transports the cages located in the rack to and/or away from an unloading point arranged at the end of the rack.

The inventive rack has the advantage over the state of the art in that it allows the full-grown fattening animals to be quickly and easily removed. The cages are automatically transported to the removal point by the conveyors for stableing-out. From there the fattening animals together with the cage are taken out of the rack. The fattening animals can then be transported to the slaughterhouse in the cages. Despite the high number of fattening animals being treated at the same time, the personnel costs are very low, as the essential steps are automated. In addition, fattening animals are exposed to little stress during removal, as they can remain in their cages, which improves the health of the animals. The invention can thus improve the living conditions of fattening animals, which also leads to an improvement in the meat quality of fattening animals. At the same time, production costs are reduced. This leads to an overall increase in the economic efficiency of the rearing of fattened poultry.

The conveying means according to the invention can have at least one endlessly circulating traction means, which extends in the direction of the longitudinal extension of the rack over its entire length. The cages preferably have a coupling element which is designed to detachably couple the cage to the traction means. Motor-driven, rotating link chains in which the coupling element can engage positively are particularly advantageous. However, the use of force-locking traction means, such as belts or bands, as is customary with endless conveyors, is also conceivable.

Preferably, the rack according to the invention has a plurality of conveying means, whereby at least one conveying means is assigned to each level, which transports the cages located in this level to and/or away from the unloading point. This design is easy to implement. In addition, the fattening animals can be fattened individually, i.e. level by level.

The traction means of the conveyor preferably runs parallel to longitudinal elements (e.g. horizontal struts) of the frame construction, which form the individual levels. Ideally, the traction means runs essentially centrally between the longitudinal elements. The advantage of this design is that the traction means cooperates with the cage's centre of gravity. A jamming of the cage when moving it within the rack is avoided.

The conveyor drive is advantageously arranged in the area of the unloading point. The drive is easily accessible there, e.g. for maintenance work.

In order to be able to supply the fattened poultry sufficiently with food and water during rearing, each level can have a number of feed dispensers and watering troughs. The number of feed dispensers preferably corresponds exactly to the maximum number of cages that the invented rack can accommodate. Thus, each cage is assigned a feed dispenser. The feed dispensers and watering troughs assigned to each level are preferably arranged on a vertically movable holder. This allows the feed dispensers and watering troughs to be automatically lifted out of the cages or lowered into them. In the raised position of the feed dispensers and watering troughs, the cages can be freely moved back and forth in the rack by the conveyor, according to the invention. In the lowered position the feed dispensers and watering troughs are easily accessible for the fattening animals in the cages.

With an advantageous design, the cages are guided along the longitudinal elements of the frame construction that define the levels of the rack. For example, guide rollers arranged on the longitudinal elements can be used, on which the cages rest. The cages can roll on the rollers with little resistance. The guide rollers can have a circumferential groove or recess into which a corresponding guide rail (e.g. with a V-shaped cross-section) located on the underside of the cage engages. This results in a particularly simple way in a lateral guidance of the cages.

Preferably, each level of the rack can have a longitudinal conveyor belt for the removal of feces from the fattening animals. Preferably, the longitudinal conveyor belt extends essentially along the entire rack below the cages located in one level. The advantage of this is that if one level is completely equipped with cages, the droppings of all animals can be safely collected. The manure is transported to the end of the rack, where it is discharged from the longitudinal conveyor belt and fed for further disposal.

Furthermore, the invention concerns a fattening poultry cage for rearing fattening poultry in a rack, in particular in an inventive rack. The poultry cage comprises a base, two side walls, a front and a rear wall and a coupling element designed to connect the cage to the means of transport of the rack.

The inventive fattening poultry cage has the advantage over the state of the art that the fattened poultry can remain in the cage until slaughter, so that the poultry is exposed to less stress. The coupling element provided on the fattening poultry cage enables largely automated installation and removal of the fattening poultry in the cage in accordance with the invention, which saves personnel and reduces costs.

s According to the invention, the coupling element can be arranged on the underside of the cage, preferably in the middle, in order to cooperate with the traction means of the conveyor running accordingly in the middle below the cage. The preferred design of the coupling element is elongated, extends parallel to the side walls of the cage and has a plurality of tooth-shaped engagement elements which can engage releasably and positively from above in a tension means of the conveyor, designed as a link chain. This allows the cage to be reliably coupled to the means of conveyance of the rack for the transmission of horizontally directed forces. The coupling takes place automatically when the cage is inserted into the rack. For decoupling, the cage only has to be removed upwards from the relevant level of the rack.

It is advantageous for the cage according to the invention to have a receptacle into which a fork-arm of a floor conveyor device can engage. This enables simple handling of the cages by means of standard industrial trucks. The holder has e.g. two or more pockets to hold forks of the fork carriage. This prevents the cage from falling sideways during transport using the floor conveyor.

The cages used according to the invention can be stackable with advantage, so that a plurality of cages can be handled simultaneously one above the other in the stack. For this purpose, the individual cage may have stacking elements which establish a releasable, positive connection to a similar poultry cage resting on the poultry cage and thus secure it against lateral slipping down.

As mentioned above, the cage according to the invention can have at least one guide rail on its underside, which preferably has a V-shaped cross-section. This has the advantage that the cage can be moved on appropriate guide rollers in the position with minimum resistance. The V-shape in combination with correspondingly shaped guide rollers simultaneously offers the possibility of lateral guidance of the cage on the rack.e, form-fit connection to a similar mast poultry cage resting on the mast poultry cage and thus secure it against lateral slipping down.

The cage may have at least one spacer element on its front and/or rear wall. The spacer element ensures that the cages arranged one behind the other in the respective level of the rack maintain the intended distance from each other.

The walls and the bottom of the cage are ideally grid-shaped. The grid of the floor is preferably designed in such a way that it offers the fattening poultry a firm and secure hold, but at the same time also ensures good manure passage. In order to minimize the risk of injury to the fattening poultry, the floor grid is advantageously made of an elastic plastic. In order to allow the fattened poultry to stand securely despite its elasticity, the floor may have reinforcement struts in certain areas.

Furthermore, the subject of the invention is a system for rearing fattened poultry, comprising at least one inventive rack and a plurality of inventive fattening poultry cages, the means of conveying the rack interacting with the coupling elements of the cages.

The system according to the invention can have several racks which are arranged parallel to each other in the direction of their longitudinal extensions. This means that a large number of fattening animals can be accommodated in a small space. In particular, the space between the parallel racks does not have to be sufficiently large to be able to carry out the installation and removal from there. According to the invention, this is done via the unloading points, which are arranged at the end, i.e. on the narrow side of each rack.

The system prefers an industrial truck with a lifting device, whereby the lifting device has a plurality of fork carriages which are arranged vertically one above the other and are movable in vertical direction relative to each other. The fork carriages are preferred, e.g. by moving the industrial truck towards the rack, and can be retracted simultaneously from the levels of the rack into the unloading point in order to transfer the poultry cages for fattening from the levels of the rack. The fork carriages arranged one above the other make it possible to remove several cages located one above the other in the levels of the rack simultaneously from the rack at the removal point. For this purpose, the industrial truck moves the individual fork carriers in a vertical direction so that the individual fork carriers are at the level of one level of the rack and can grip the cages inside. After the cages have been removed from the rack, the industrial truck lowers the fork carriages so that the cages are stacked directly on top of each other. The stack thus formed can then be transported further, for example, it can be loaded onto a truck for transport to the slaughterhouse. The cages are then stored in the racks for the purpose of stalling in the reverse order. The industrial truck first grips with its fork carriages between the cages stacked one above the other, in which the animals to be stowed are located. Then the industrial truck moves the cages gripped by the fork carriages in a vertical direction so that each cage is at one level of the rack and the cages are set down simultaneously, each cage in a different level, in the rack. The cages are then transported along the rack to the desired position by their conveyors as described above. Ideally, the number of fork carriers of the forklift corresponds exactly to the number of levels of the rack.

The industrial truck can be placed in front of the extraction points, i.e. in front of the narrow sides of the racks. In order to be able to load several racks one after the other with the cages according to the invention or to remove the cages from the racks, the industrial truck can preferably be moved transversely to the longitudinal extensions of the racks. A rail guide on which the industrial truck is guided is particularly suitable for this purpose.

The fork carriers of the industrial truck used according to the invention preferably comprise two horizontally spaced tines or forks, as is usual with conventional industrial trucks.

According to the invention, an industrial truck is a means of transport that is designed to lift, stack and/or store loads on shelves. The industrial truck picks up the loads and places them again. For example, forklifts or lift trucks that can be moved freely in space can be regarded as inventive industrial trucks. But also rack conveyors fall under floor conveyors according to invention. Rack stackers are characterised by the fact that they are not free in their movement, but are guided in some form. This can be done, for example, by the fact that they are movably guided on the ground in a rail guide.

Furthermore, the subject of the invention is a method for rearing fattened poultry, whereby the individual fattened poultry from the hatchery to the slaughterhouse remains continuously in the same cage, in particular in a cage according to the invention. This reduces to a minimum the stress and the risk of injury to which the animals are exposed during transport between the individual sites. In addition to improving the living conditions of fattening poultry, an improved meat quality can also be achieved.

Preferably the fattened poultry is transported in the cages from the hatchery to a rearing arrangement, in particular to a rack according to the invention, where it then remains in the cages until the final fattening weight is reached. Ideally, the fattened poultry is stored in the rack together with the cage using an industrial truck as described above.

Advantageously, after the fattening poultry has reached its final weight ready for slaughter, it is removed from the rack in the cage and transported to the slaughterhouse, whereby the cages are stacked as described above. Removal from the racking is preferably again carried out with the aid of the floor conveyor device.

For slaughter, the fattened poultry is then preferably first removed from the cages in the slaughterhouse and fed directly to the device used for slaughter. The empty cages can then be cleaned in a cleaning device. Processes using ultrasound are particularly suitable for this purpose. The clean cages are then returned to the hatchery, where they are used again to take up poultry and to raise them.

The invention and the technical context are explained in more detail below using the figures. It should be noted that the figures show particularly preferred variants of the invention. However, the invention is not limited to the variants shown. In particular, where it makes technical sense, the invention includes any combination of the technical features listed in the claims or described as relevant to the invention in the description.

In the figures

FIG. 6 shows a view of the front wall of the fattening poultry cage as shown in FIG. 5;

FIG. 7 shows a view of the side wall of the fattening poultry cage as shown in FIG. 5.

Figure 1:
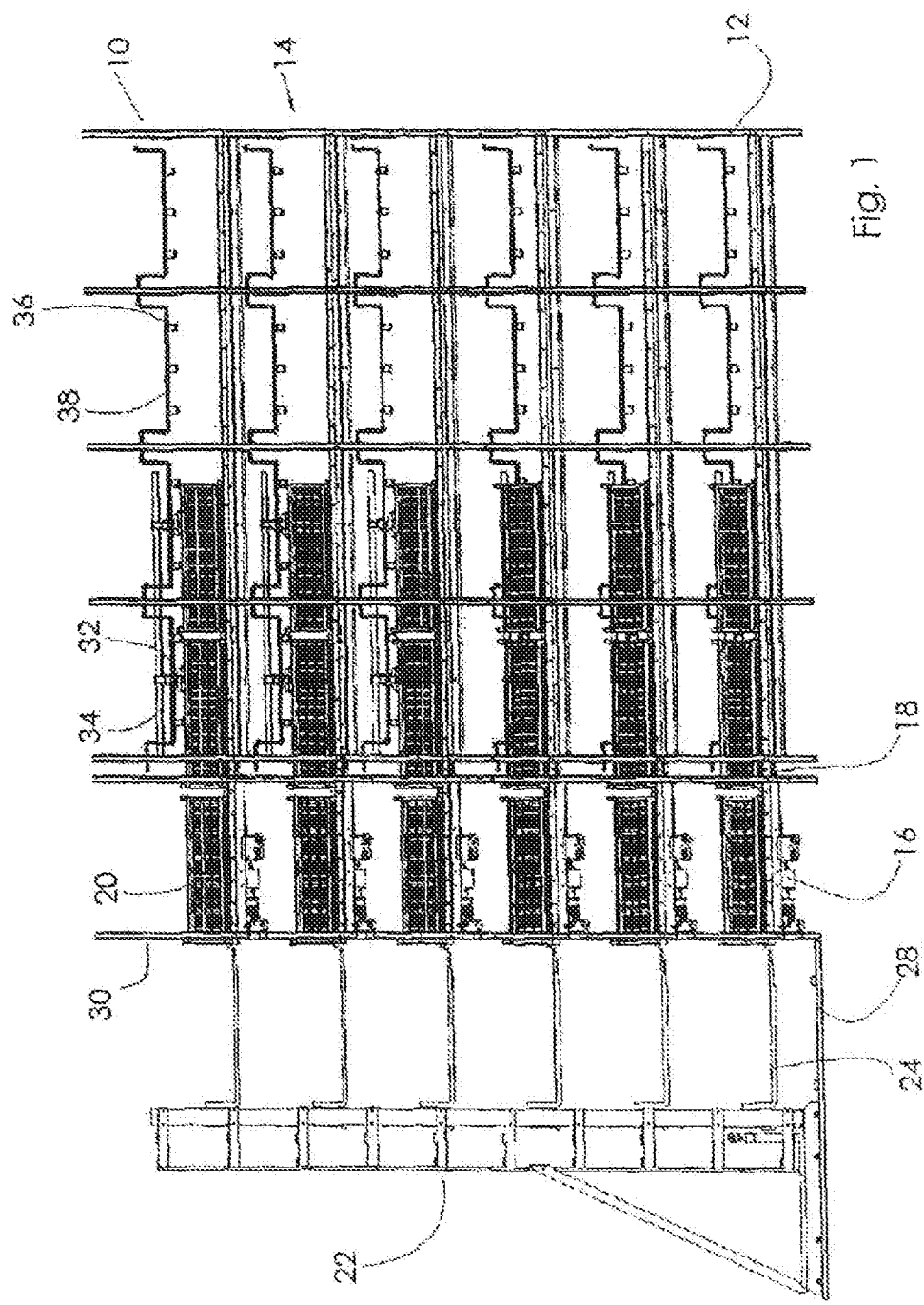
FIG. 1 shows a plan view on one long side of an inventive rack.

FIG. 1 shows a plan view of the long side of an inventive rack 10. Rack 10 comprises a frame construction 12 and a plurality of levels 14 to accommodate several fattening poultry cages 20 arranged one behind the other along the rack. Furthermore, in each level 14 of rack 10 there is a conveyor 16 which transports the cages 20 located in rack 10 along the respective level 14 and in the direction of the longitudinal extension of rack 10, namely to and/or away from a sampling point 30. The unloading point 30 is located in FIG. 1 at the left end, i.e. on the narrow side of rack 10. In FIG. 1 the drives of the conveyors 16 are to be recognized in the area of the unloading point 30 below the cages 20 located there.

Conveyor means 16 each has a traction means 18 in the form of an endlessly circulating link chain, which extends below the cages 20 in the relevant level 14 in the longitudinal direction of the rack 10 over its entire length. Corresponding coupling elements 58 on the underside of the cages 20 engage into the traction means 18.

In front of the narrow side of shelf 10 (in FIGS. 1 and 2 on the left) there is an industrial truck with a lifting device 22. The lifting device 22 has a plurality of fork carriages 24, which are arranged vertically one above the other and are movable relative to each other in vertical direction. The fork carriages 24 each have two tines 26 spaced apart from each other. The industrial truck 22 shown in FIG. 1 is a rack conveyor. The rack conveyor can be moved back and forth along a rail arrangement 28 in order to simultaneously retract the fork carriage 24 from level 14 of rack 10 into or out of unloading point 30 to take over the fattening poultry cages 20. The industrial truck 22 can also be designed as a freely movable forklift truck. The number of fork carriages 24 corresponds to the number of levels 14 of the rack. This means that the individual levels 14 of rack 10 can be loaded or unloaded simultaneously.

Figure 2:
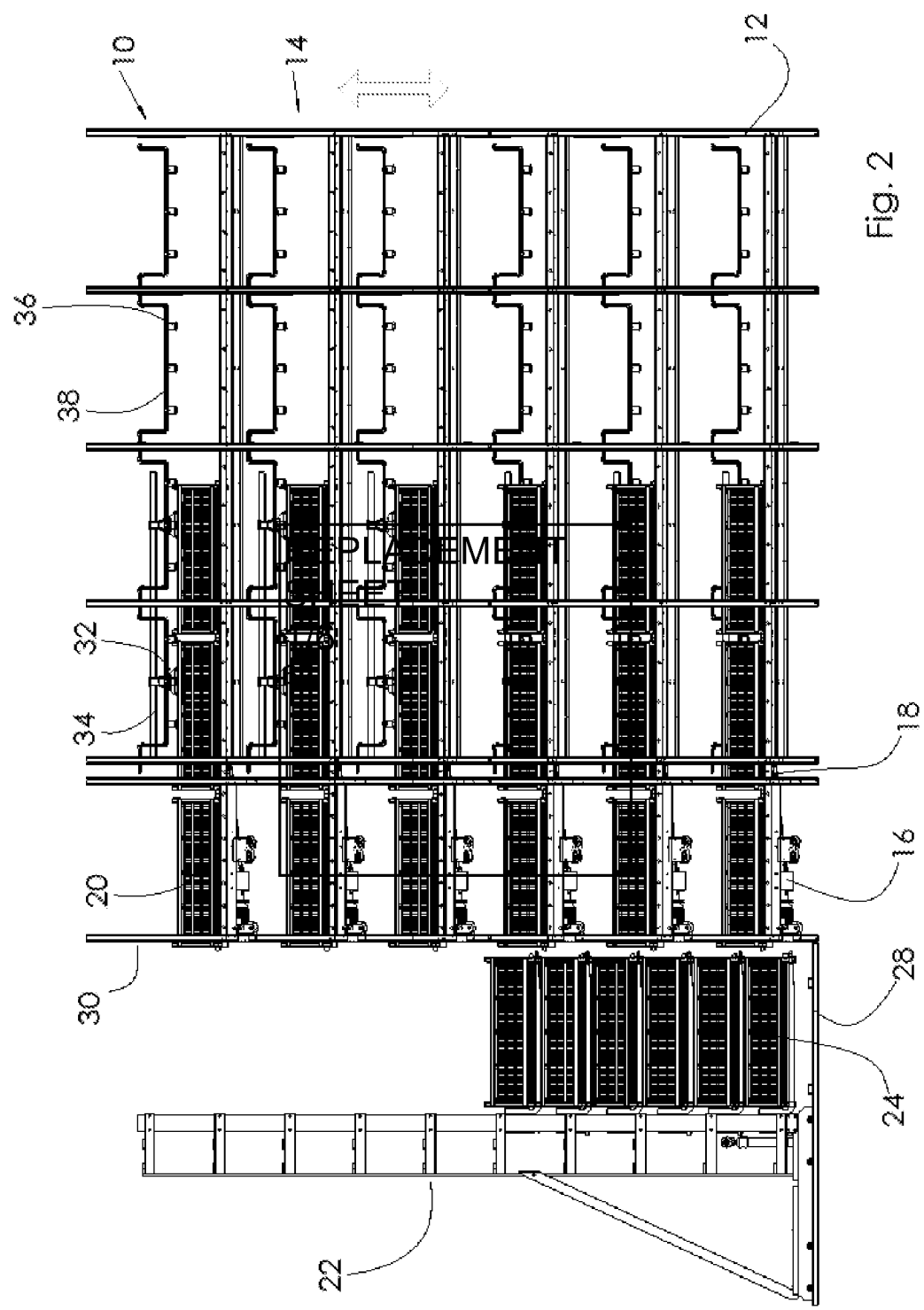
FIG. 2 shows a further further plan view on the long side of the rack according to the invention.

In FIG. 1, the individual fork carriages 24 are arranged exactly at the height of a level 14 and can grab the cages 20 located there via the unloading points 30. After the cages 20 have been removed from the rack 10/of the unloading point 30, the industrial truck 22 lowers the fork carriage 24 in such a way that the cages 20 stand directly on top of each other in a stack. This is shown in FIG. 2. The cages 20 arranged one above the other can then be transported away together. For further removal, the cages 20 still in level 14 are conveyed to the left by the conveyors 16, so that in each level 14 a cage 20 is located within the unloading point 30 and can be removed by means of the floor conveyor to form a next stack. This is continued until all cages are removed from rack 10. In this way, the fattening animals in the cages 20 are removed. The procedure is reversed for stabling.

In order to be able to supply the fattened poultry sufficiently with food and water during rearing, each level 14 has a number of feed dispensers 32 and watering troughs 36. The feed dispensers 32 on one level 14 and watering troughs 36 are each arranged on a holder 34, 38. The troughs 36 with water and the feed dispensers 32 with feed are also operated via the holders 34, 38. The brackets 34, 38 are movable in vertical direction. This is indicated in FIG. 2 by the double arrow. The troughs 36 and feed dispenser 32 are automatically lifted out of their path of movement by the vertical movement for moving the cages 20 in the levels 14.

Figure 3:
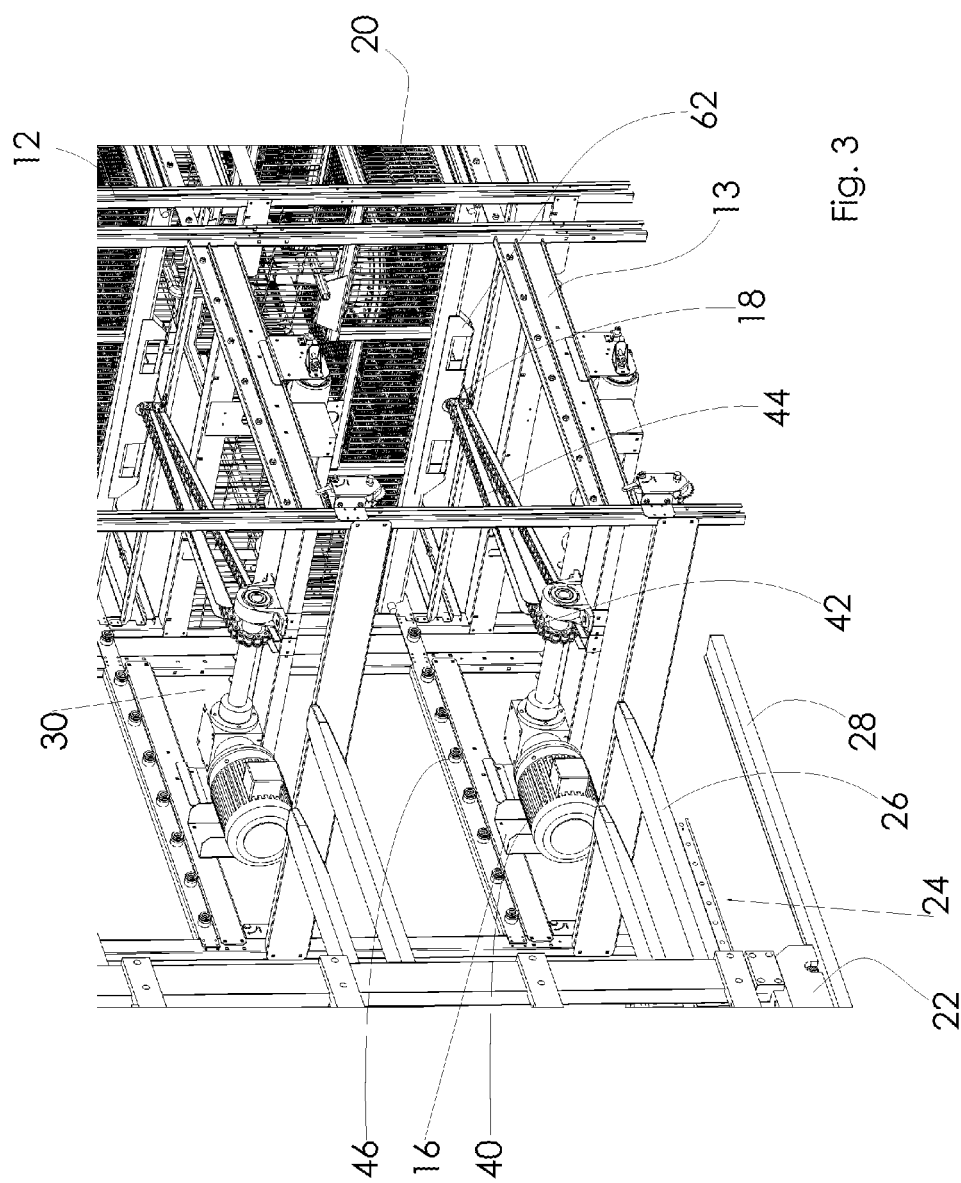
FIG. 3 shows a perspective partial view of the unloading point of the rack according to the invention.

FIG. 3 shows a perspective view of a part of the extraction point 30 of the inventive rack 10. the endless traction means 18 (link chain) of the conveyor 16 and the associated electric drive 40 can be recognized. The actuator 40 is arranged in the area of the unloading point 30, so that it is easily accessible when required (maintenance). Each level 14 of rack 10 is assigned a traction means 18. The traction means 18 runs parallel to longitudinal elements 13 of the frame construction 12. ideally, the traction means 18 runs essentially centrally between the longitudinal elements 13. to improve the alignment of the traction means 18, it can be guided in a rail 44 at least in certain areas. Guide rollers 46 are arranged on the longitudinal elements 13, over which the cages 20 are guided longitudinally movable on position 10.

Figure 4:
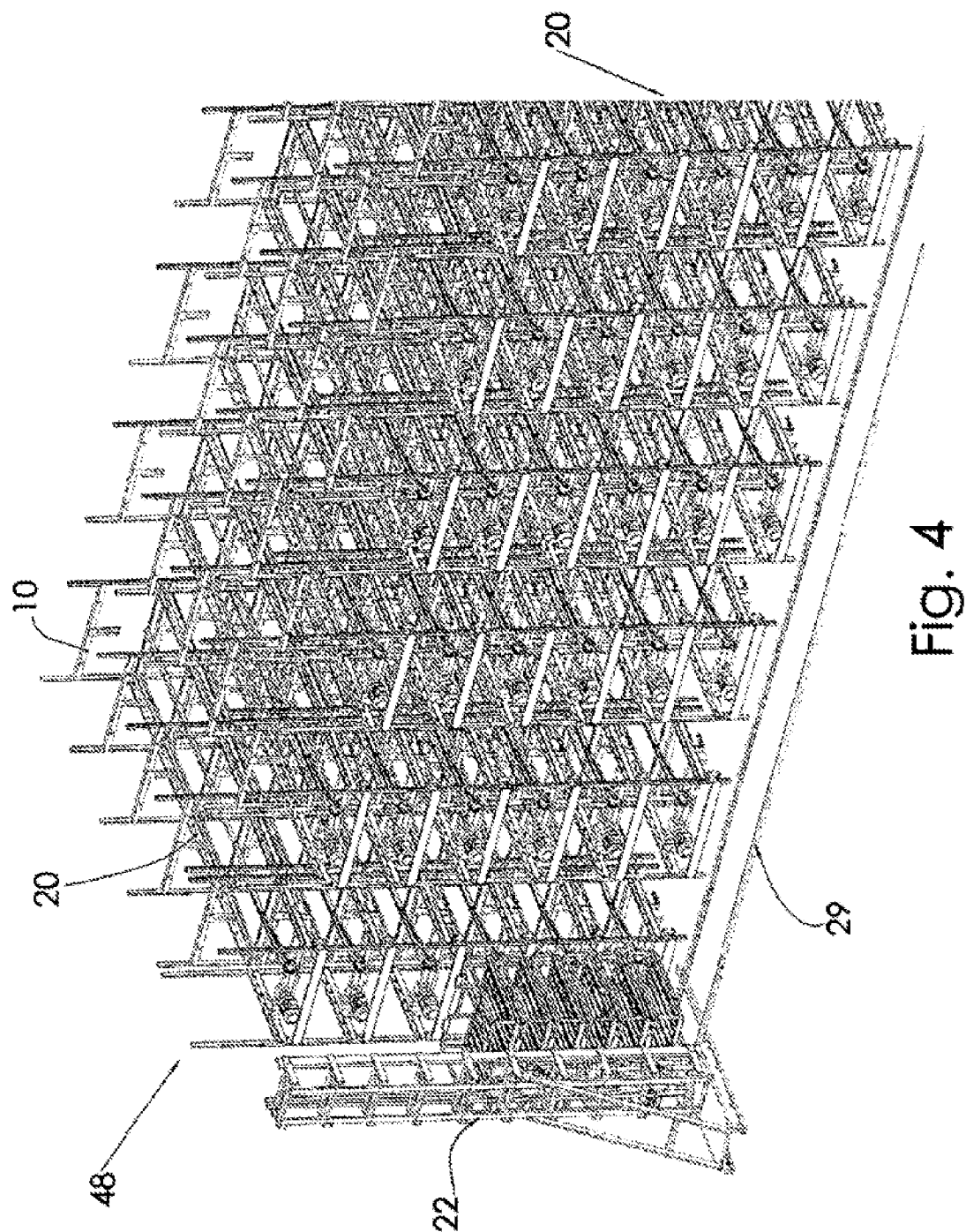
FIG. 4 shows a perspective view of an inventive system.

FIG. 4 shows a perspective view of an inventive system 48 for rearing fattening poultry. System 48 has several racks 10 according to the invention, which are arranged parallel to each other in the direction of their respective longitudinal extensions, and a plurality of cages 20 according to the invention. In the system, the conveyors 16 of the racks 10 interact with the coupling elements 58 of the individual cages 20 in such a way that the cages 20 can be moved in the racks 10 in the longitudinal direction of the racks 10. System 48 also has an industrial truck with lifting device 22 arranged on the narrow side of the racks 10. To equip the individual racks 10 with the cages 20 or to remove the cages 20 from the racks 10, the industrial truck 22 can be moved in the direction transverse to the longitudinal extension of the racks 10. For this purpose, the industrial truck 22 has a rail guide 29 which extends in front of the racks 10.

Figure 5:
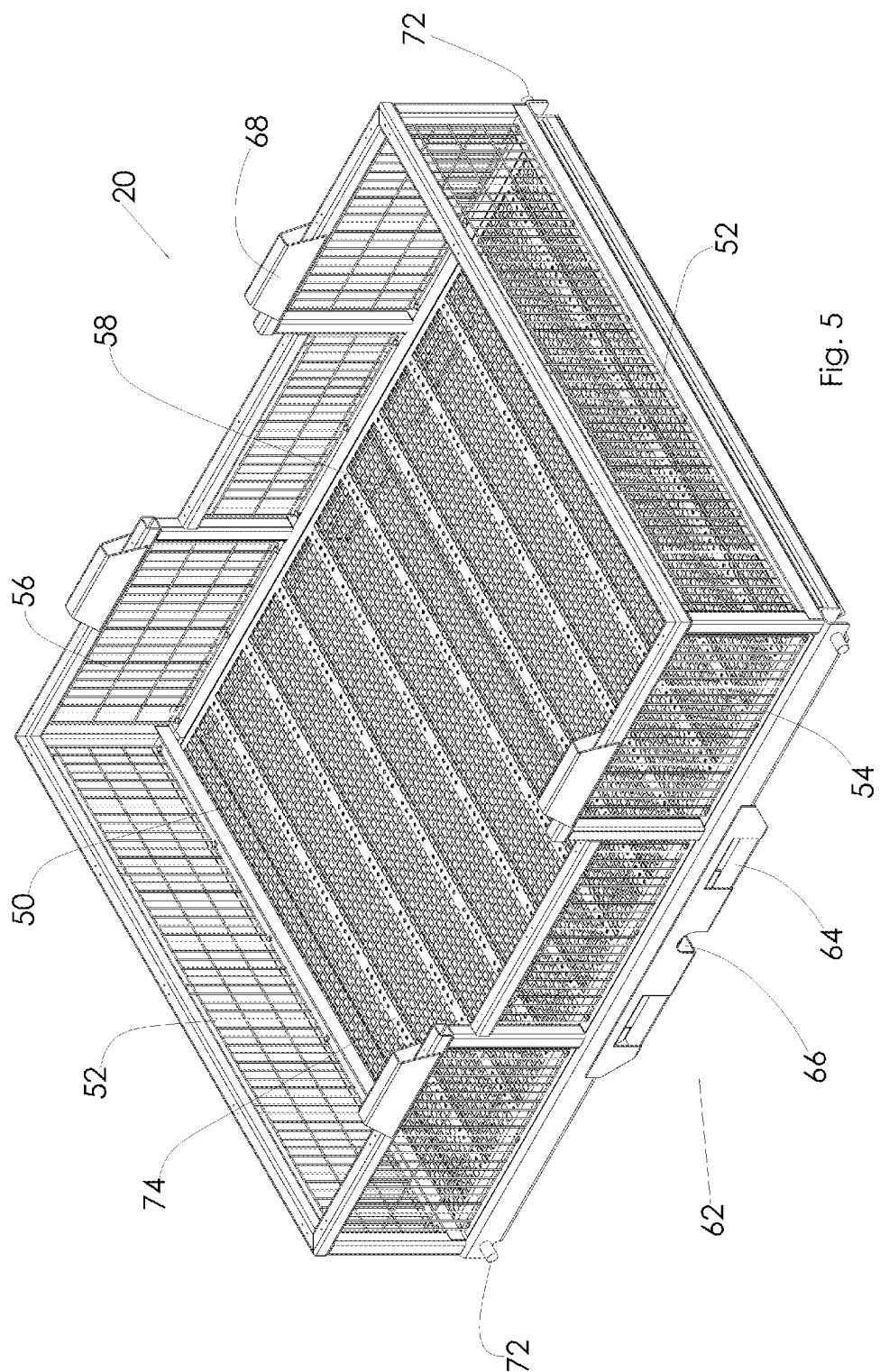
FIG. 5 shows perspective view of an inventive fattening poultry cage.

FIG. 5 shows a perspective view of an inventive fattening poultry cage 20 in a first design. The poultry cage 20 comprises a floor 50, two side walls 52, a front 54 and a rear wall 56, the poultry cage 20 comprises a coupling element 58 with engagement elements 60 and the coupling element 58 is designed to interact with the traction means 18. The coupling element 58 is elongated for this purpose, extends parallel to the side walls 52 of the cage 20 and has a plurality of tooth-shaped engagement elements 60, which engage from above into the traction means 18 designed as a link chain.

Furthermore, the cage 20 has a receptacle 62 at the bottom. The fork carriage 24 of the industrial truck 22 can engage in the receptacle 62. The receptacle 62 is designed in such a way that the cages 20 are safely picked up by the industrial truck 22 and falling down during transport is avoided.

The cage 20 has two spacer elements 72 at its front side 54 and at its rear wall 56. The spacer elements 72 prevent cages 20 arranged one behind the other in position 10 from coming into direct contact with their walls 54, 56. The spacer elements 72 ensure the correct positioning of the cages 20 in the levels 14 of the rack 10.

To make the cages 20 stackable, they have stacking elements 68 on the upper side of the front 54 and on the upper side of the rear wall 56, which provide a detachable, form-fit connection to a similar cage 20 resting on the cage 20 and thus secure it against lateral slipping down.

The bottom 50 of cage 20 is designed in the form of a grid, whereby it is designed in such a way that it offers the fattening poultry a firm and secure hold, but at the same time ensures good manure passage. Ideally, the floor grid should be made of elastic plastic. In order to allow the fattened poultry to stand securely despite its elasticity, the floor has 50 reinforcement struts in some areas. The reinforcement struts 74 run parallel to each other, whereby they are preferably evenly spaced from each other.

FIG. 6 shows a schematic view of the front wall 54 of the fattening cage 20 as shown in FIG. 5, the coupling element 58 is arranged below the floor 50 and extends parallel to the side walls 52 of the cage 20, ideally the coupling element 58 is arranged in the middle below the cage 20.

A receptacle 62 is arranged below the front wall 54 and the rear wall 56. The receptacle 62 has two openings 64 arranged in series and at a distance from each other, into which the tines 26 of the fork carriage 24 can engage. The openings 64 are square and essentially correspond to the shape and dimensions of the tines 26. The receptacle 62 is arranged in the centre of the cage 20, the openings 64 being symmetrical to a centre line of the cage 20. The receptacle 62 preferably has a recess 66, which is arranged between the openings 64, advantageously exactly in the middle of it. If the cage 20 is in position 10, the traction means 18 of the rack 10 can grip through the recess 66.

The stacking elements 68 are designed to prevent the stacked cages 20 from slipping during transport. For this purpose, the cage 20 has two stacking elements 68 on the upper side of the front wall 54 and two stacking elements 68 on the upper side of the rear wall 56, which are designed in such a way that they laterally enclose the receptacle 62 of a further cage 20 stacked on the cage 20 and thus allow a positive connection between cages arranged one above the other.

Furthermore, the cage 20 has two guide rails 70, each extending below one side wall 52, preferably along the entire side wall 52. The guide rails 70 have a V-shaped cross-section. This allows the frictional resistance between cage 20 and position 10 to be reduced to a minimum when moving the cages 20 within the rack 10. The V-shaped guide rails 70 run on the guide rollers 46.

FIG. 7 shows a schematic view of the side wall of the fattening poultry cage 20 as shown in FIG. 5: In order to achieve the best possible connection between coupling element 58 and the traction means 18 of rack 10, coupling element 58 extends essentially from the front wall 54 to the rear wall 56 of cage 20. The engagement element 60 is tooth-shaped, whereby a plurality of downwardly directed, tooth-shaped engagement elements 60 are arranged along the coupling element 58. Several groups of engagement elements 60 are arranged one behind the other.

The walls 52, 54, 56 of cage 20 are grid-shaped to ensure high strength and stability at low weight.

LIST OF REFERENCE NUMERALS

10 Rack
12 Frame construction rack
13 Longitudinal elements of the frame construction
14 Level of the rack
16 Conveyor
18 Traction means
20 Poultry cage for fattening
22 Industrial truck with lifting device
24 Fork carriage
26 Tines fork carriage
28 Rail guide (forward/reverse) for industrial truck
29 Rail guide (lateral direction) for industrial truck
30 Unloading point
32 Food dispensers
34 Feeding dispenser holder
36 Drinking trough
38 Drinking trough holder
40 Drive for conveyors
42 Drive wheel Conveyors
44 Traction means rail guide
46 Guide rollers
48 System for rearing fattening poultry
50 Floor
52 Side wall
54 Front wall
56 Rear wall
58 Coupling element
60 Engaging element
62 Receptacle
64 Openings
66 Recess of receptacle
68 Stacking elements
70 Guide rail 72 Spacer element
74 Reinforcing struts
76 Frame of poultry cage

The invention claimed is:

1. A rack for receiving a plurality of fattening poultry cages, comprising:
   a frame construction and
   a plurality of levels for each receiving a plurality of fattening poultry cages arranged one behind the other along a longitudinal extension of the rack,
   wherein at least one conveying means comprises an endless traction means extending substantially over an entire length of the rack and transports the cages located in the rack toward and away from an unloading point arranged at an end of the rack.

2. A rack according to claim 1, wherein a traction means, seen in a direction transverse to the longitudinal extension of the rack, is arranged centrally between longitudinal elements of the frame structure assigned to a corresponding plane.

3. A rack according to claim 1, further comprising a plurality of feed dispensers and troughs, wherein the feed dispensers and troughs associated with each level being arranged on a vertically movable holder.

4. A rack according to claim 1, wherein the cages are guided longitudinally movable on the longitudinal elements of the frame structure.

5. A rack according to claim 4, wherein guide rollers arranged on the longitudinal elements of the frame structure on which the cages rest.

6. A fattening poultry cage for rearing fattened poultry, in particular broilers, for reception in a rack, in particular in a rack according to claim 1, comprising:
   a floor,
   two side walls,
   one front and one rear wall,
   wherein a coupling element adapted to detachably couple the cage to a conveying means of the rack, wherein said conveying means further comprises an endless traction means extending substantially over an entire length of the rack.

7. A fattening poultry cage according to claim 6, wherein the coupling element is centrally arranged on the underside of the cage.

8. A fattening poultry cage according to claim 6, wherein the coupling element is elongated, extends parallel to the side walls of the cage and comprises a plurality of tooth-shaped engagement elements which engage from above in a traction means of the conveying means formed as a link chain.

9. A fattening poultry cage according to claim 6, further comprising a receptacle for a fork carriage of an industrial truck.

10. A fattening poultry cage according to claim 9, wherein the fattening poultry cage comprises stacking elements which establish a releasable, positive-locking connection to a similar fattening poultry cage resting on the fattening poultry cage and thus secure it against laterally slipping down.

11. A fattening poultry cage according to claim 6, wherein the cage has on its underside at least one guide rail having a V-shaped cross-section.

12. A fattening poultry cage according to claim 6, wherein the cage has at least one spacer element on its front and rear wall.

13. A system according to claim 1, wherein a plurality of racks arranged parallel to each other in the direction of their longitudinal extensions.

14. A system according to claim 1, further comprising an industrial truck with a lifting device, wherein the lifting device comprises a plurality of fork carriages arranged vertically one above the other, and are movable in a vertical direction relative to one another.

15. A system according to claim 14, wherein the number of fork carriers is equal to the number of levels of the rack.

16. A system according to claim 14, wherein the fork carriages for removing cages from or feeding cages into the rack simultaneously retractable into a unloading point.

* * * * *